United States Patent [19]

Cameron et al.

[11] 4,367,651

[45] Jan. 11, 1983

[54] PRESSURE TRANSDUCER BODY

[75] Inventors: Donald C. Cameron; Donnie L. Stufflebeam, both of Tulsa, Okla.; John W. Ekey, Harris, Tex.

[73] Assignee: The Dow Chemical Company, Midland, Mich.

[21] Appl. No.: 248,770

[22] Filed: Mar. 30, 1981

[51] Int. Cl.³ .................... G01L 7/00; F15B 15/18; F16J 3/00

[52] U.S. Cl. ...................................... 73/706; 92/105; 60/593

[58] Field of Search .................. 73/706, 715; 92/105; 60/593

[56] References Cited

U.S. PATENT DOCUMENTS

| 1,243,843 | 10/1917 | Ledoux | 73/715 X |
| 2,216,374 | 10/1940 | Martin | 73/715 X |
| 2,353,191 | 7/1944 | Samiran | 73/715 X |
| 3,255,633 | 6/1966 | Worley et al. | 73/715 |
| 3,718,046 | 2/1973 | McJones | 73/706 |
| 3,971,217 | 7/1976 | Firth et al. | 92/105 |

FOREIGN PATENT DOCUMENTS

| 593563 | 3/1960 | Canada | 73/715 |
| 1004147 | 3/1947 | France | 73/715 |
| 1401925 | 8/1975 | United Kingdom | 73/715 |
| 548775 | 3/1977 | U.S.S.R. | 73/706 |

Primary Examiner—Edward R. Kazenske
Assistant Examiner—David V. Carlson
Attorney, Agent, or Firm—L. Wayne White

[57] ABSTRACT

A pressure transducer body is described which has a bore running its length and contains (a) a means for receiving a pressure transducer, (b) a fluid reservoir, (c) a stationary elastic plug member having embedded therein a T-shaped rigid pin member, and (d) a chamber for receiving a fluid under pressure. The elements of the transducer body are combined in such a way that pressures of fluids flowing into chamber (d) are accurately measured using conventional pressure transducers even at very high pressures (e.g. 20,000 psi). More importantly, perhaps, the configuration of the transducer body permits accurate pressure measurements on pressurized fluids which are corrosive and/or abrasive. This makes the pressure transducer bodies particularly useful in the oilfield service industries for measuring the pressure of acidizing or hydraulic fracturing fluids used in stimulation.

5 Claims, 2 Drawing Figures

PRESSURE TRANSDUCER BODY

FIELD OF THE INVENTION

This invention pertains to a new pressure transducer body, and in particular this invention pertains to a novel pressure transducer body adapted for use in measuring pressures of corrosive and/or abrasive fluids subject to pulsating pressure loadings.

DESCRIPTION OF THE PRIOR ART

There are a variety of transducer bodies known in the art. For transducer bodies that might be subject to heavy pulsating types of loading, the most commonly used device contains a diaphram with a hydraulic liquid separating the diaphram and a recording pressure transducer. This type of transducer body has problems with rupture of the diaphram due to pulsations or loss of hydraulic fluid which allows the diaphram to deform excessively.

Another type of transducer body has been a piston type in which a hydraulic liquid is located between the pressure transducer and the piston. Again, under operating conditions the heavy pulsating types of loading usually causes fluid leak off and permits the piston to "bottom out" against the transducer. This results in inaccurate and unreliable readings.

SUMMARY OF THE INVENTION

A novel pressure transducer body has now been discovered having
  (a) means for receiving a pressure transducer,
  (b) a fluid reservoir,
  (c) a stationary elastic plug member, and
  (d) a chamber for receiving a fluid under pressure;
said means for receiving a pressure transducer, (a), being located near the first end of said transducer body and in fluid communication with said fluid reservoir,
said fluid reservoir, (b), being defined within said bore and being located between said means for receiving a pressure transducer (a), and said stationary elastic plug member,
said stationary elastic plug member, (c), having a first end in fluid communication with said fluid reservoir (b), and a second end adjacent to said chamber for receiving a fluid under pressure,
said chamber for receiving a fluid under pressure, (d), being defined within said bore,
said plug member (c) also having a rigid pin member, (p), embedded therein; said pin member, (p), being defined by an elongate shaft extending partially through said stationary elastic plug (c), and positioned coaxial to the bore and having (i) a first end disposed toward said fluid reservoir plug (b), and defining a flat or substantially flat face which is positioned perpendicular to the bore, and (ii) a second end disposed toward said chamber for receiving a fluid under pressure (d), said second end having an attached head which is external to said plug member, (c), and which has a flat or substantially flat face positioned perpendicular to the bore, the flat face of the head having a surface area greater than a cross-sectional area of the shaft but less than a cross-sectional area of the bore.

DETAILED DESCRIPTION OF THE INVENTION

Figure 1:
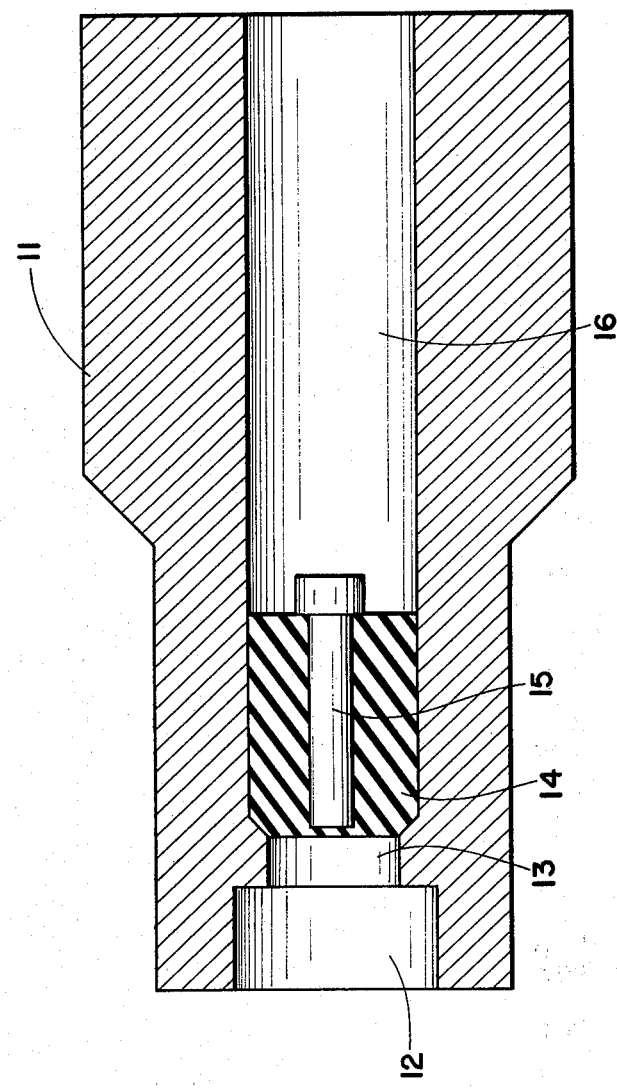
FIG. 1 is a schematic of a cross-sectional view.
Figure 2:
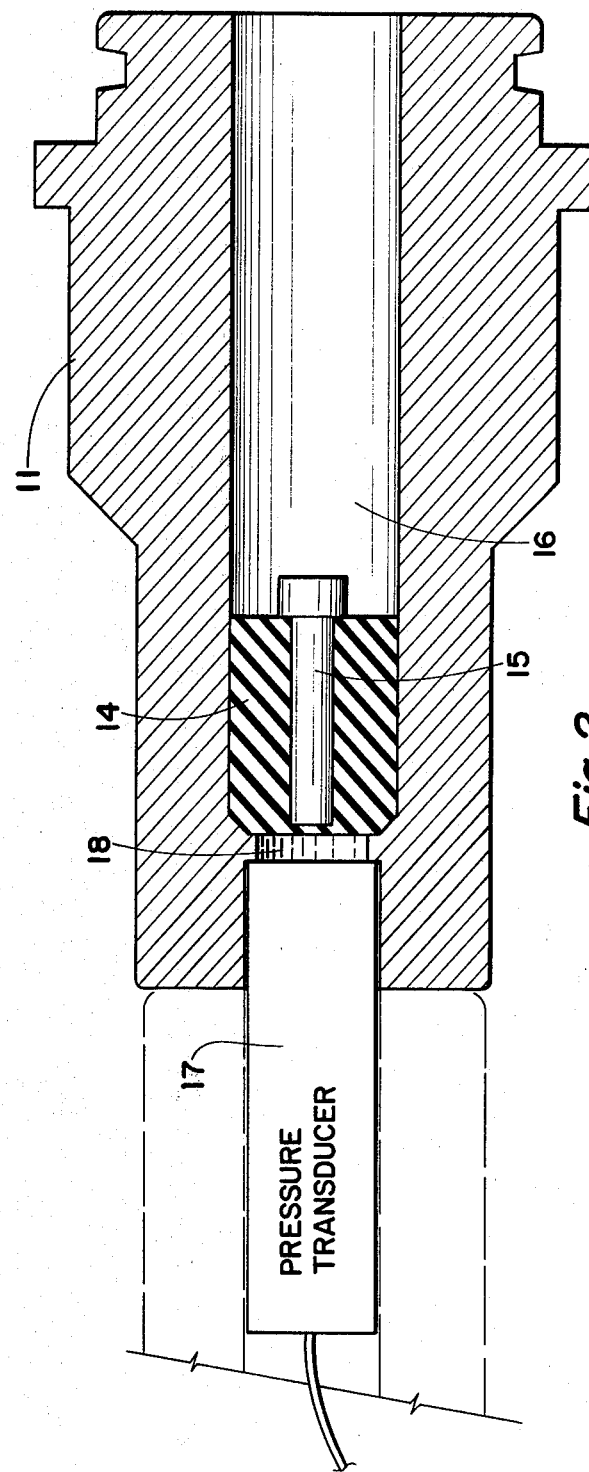
FIG. 2 is another schematic of a cross-sectional view which illustrates other features of an operational embodiment.

The invention is illustrated by reference to FIGS. 1 and 2. It is apparent that the external shape of the transducer body can take on whatever configuration is convenient to the user. The transducer has a first end and a second end in defining a bore running the length from the first end to the second end. The bore may be of substantially uniform diameter, or it may be of various diameters, as shown in FIGS. 1 and 2. The transducer body contains a means for receiving a pressure transducer which is located near the first end of the transducer body which is in fluid communication with a fluid reservoir (13). In FIG. 1, this is illustrated by items (12) and (13).

The fluid reservoir (13) is defined within the bore and is located between (12) and a stationary elastic plug member (14).

The stationary elastic plug member has a first end in fluid communication with the fluid reservoir and it has a second end adjacent to a chamber (16) for receiving a fluid under pressure. The chamber for receiving a fluid under pressure is defined within the bore.

The stationary elastic plug member can be prepared using a variety of elastomeric materials, but it is preferably made of elastomeric materials that are resistant to chemicals, heat and abrasion. For example, the plug member can be prepared using a variety of rubbers, such as styrene-butadiene rubber, ethylene-propylene terpolymers (EPDM), urethanes, nitrile interpolymers, fluorinated aliphatic hydrocarbon polymers (e.g. those sold by DuPont under the trade name VIATON), and the like. Of these, the fluorinated aliphatic polymers are most preferred. The elastic plug member can be prepared external to the transducer body but is preferably prepared by curing the elastomeric material in situ. By way of illustration, the necessary amounts of uncured VIATON rubber is charged to the bore, the rigid pin inserted and held in place while the Viaton rubber is cured using appropriate amounts of head and pressure to produce a substantially void free elastomeric cured plug.

The T-shaped rigid pin member (15) is defined by an elongate shaft extending substantially through the elastomeric plug member and it is positioned coaxial to the bore. The shaft of the pin has a first end exposed towards the fluid reservoir and it defines a flat or substantially flat face which is positioned perpendicular to the bore. Normally, the face of the first end is merely a cross-section of the shaft. The second end of the shaft is disposed towards the chamber for receiving fluid under pressure. The second end of the shaft has a head attached which is external to the elastomeric rubber plug. As shown in FIG. 1, the shaft extends into the chamber area and the head of the shaft is located outside of the elastomeric plug. The head of the shaft also has a flat or substantially flat face which is positioned perpendicular to the bore. The flat face of the head has a surface area that is greater than a cross-sectional area of the shaft itself but less than a cross-sectional area of the bore. The T-shaped pin can of unit construction or assembled from multiple parts. Preferably, the pin is of unit construction. Also it is preferred that the pin and the attached head each have a circular cross-section. Preferrably the elongate shaft of said pin member terminates at a point near the first end of said stationary elastic plug member. The pins may be manufactured by any suitable process, but applicants have found it convenient to merely cut a round rod to length and to machine part of it down to form the shaft. For example, when preparing a transducer body having a one inch diameter bore, the pin has been conveniently prepared by cutting a ⅜ inch rod to a length of approximately 1⅜ inches and machining it down so it as to leave a head having ¼ inch thickness and a shaft having 1⅛ inch length and ¼ inch diameter; this pin, for example is used in a VIATON plug cured in situ with a plug length of 1⅜–1½ inches.

The fluid used in the fluid reservoir can be varied and is noncritical so long as it is an essentially noncompressible hydraulic fluid. The fluid of course, should completely fill the reservoir without leaving air bubbles or other void spaces. The fluid can be either liquid or semi-solid and applicants have found it useful to use a high viscosity silicon or hydrocarbon grease to fill the fluid reservoir. The fluid in the reservoir is of course, in fluid communication with the first end of the elastomeric plug member and the transducer. In FIGS. 1 and 2, this fluid communication is established by merely having a direct interface between the fluid in the reservoir and the plug member and the pressure sensing surface of a conventional pressure transducer. This is illustrated in FIG. 2. Generally, a fluid retaining means is used to prevent fluid in the reservoir from bypassing the body of the transducer. One such fluid retaining means is illustrated in FIG. 2 where a shoulder is placed in the bore of the transducer body. Other fluid retaining means (e.g. O-rings, rubber gaskets, etc). can be used; such means would be readily apparent to the skilled artisan. The pressure transducers themselves are likewise a commercial commodity and can be varied. Those with a circular cross-section and flat recording face are, however, preferred.

The transducer bodies are normally mounted on a pressure pump or pipeline carrying a liquid under pressure. The pressurized liquid flows into the cavity (16) and impinges against the T-shaped rigid pin member. This causes a deflection of the pin member toward the fluid in the fluid reservoir, which in turn transmits the pressure to the pressure transducer. Pressure transducer bodies formed according to the present invention have been found to be exceedingly reliable and durable and have performed with a high degree of accuracy. Attempts to prepare "similar" transducer bodies using just a solid elastomeric plug (without the T-shaped pin) or using an elastomeric plug having a pin without the head attached were substantially less accurate and gave less reproducible results.

What is claimed is:

1. A pressure transducer body having a first end and a second end defining a bore of generally circular cross-section which extends, along with its axis of generation, from the first end to the second end, and having
    (a) means for receiving a pressure transducer,
    (b) a fluid reservoir,
    (c) a stationary elastic plug member, and
    (d) a chamber for receiving a fluid under pressure;
    said means for receiving a pressure transducer, (a), being located near the first end of said transducer body and in fluid communication with said fluid reservoir,
    said fluid reservoir, (b), being defined within said bore and being located between said means for receiving a pressure transducer, (a), and said stationary elastic plug member,
    said stationary elastic plug member, (c), having a first end in fluid communication with said fluid reservoir (b), and a second end adjacent to said chamber for receiving a fluid under pressure,
    said chamber for receiving a fluid under pressure, (d), being defined within said bore,
    said plug member (c) also having a rigid pin member, (p), embedded therein; said pin member, (p), being defined by an elongate shaft extending partially through said stationary elastic plug (c), and positioned coaxial to the bore and having (i) a first end disposed toward said fluid reservoir, (b), and defining a flat or substantially flat face which is positioned perpendicular to the bore, and (ii) a second end disposed toward said chamber for receiving a fluid under pressure (d), said second end having an attached head which is external to said plug member, (c), and which has a flat or substantially flat face positioned perpendicular to the bore, the flat face of the head having a surface area greater than a cross-sectional area of the shaft but less than a cross-sectional area of the bore.

2. The pressure transducer body defined by claim 1 wherein the shaft and attached head of said pin member each have a circular cross section.

3. The pressure transducer body defined by claim 1 additionally comprising a non-compressible hydraulic fluid which fills (b).

4. The pressure transducer body defined by claim 3 additionally comprising a pressure transducer in operational communication therewith.

5. The pressure transducer body defined by any one of claims 1, 2, 3 or 4 wherein the elongate shaft of said pin member terminates at a point near the first end of said stationary elastic plug member.

* * * * *